United States Patent [19]
Topf, Jr.

[11] Patent Number: 6,126,206
[45] Date of Patent: *Oct. 3, 2000

[54] INTERNAL CONDUIT SEALING MEMBER AND BAND

[75] Inventor: Henry E. Topf, Jr., Wellsboro, Pa.

[73] Assignee: Miller Pipeline Corporation, Indianapolis, Ind.

[*] Notice: This patent issued on a continued prosecution application filed under 37 CFR 1.53(d), and is subject to the twenty year patent term provisions of 35 U.S.C. 154(a)(2).

[21] Appl. No.: 09/026,645

[22] Filed: Feb. 20, 1998

[51] Int. Cl.$^7$ ..................................... F16L 33/16
[52] U.S. Cl. .......................... 285/109; 285/397; 138/97
[58] Field of Search ................................... 267/158, 160, 267/161, 164; 285/109, 236, 328, 370, 397, 89, 92, 104; 277/607; 138/97

[56] References Cited

U.S. PATENT DOCUMENTS

| | | | |
|---|---|---|---|
| 2,615,740 | 10/1952 | Nathan | 277/607 X |
| 4,303,103 | 12/1981 | Marks et al. | 285/109 X |
| 4,469,467 | 9/1984 | Odill et al. | 285/109 X |
| 4,685,704 | 8/1987 | Kolar | 285/109 |
| 4,927,189 | 5/1990 | Burkit | 285/109 |
| 5,163,717 | 11/1992 | Wise | 285/236 |
| 5,911,446 | 6/1999 | McLennan et al. | 285/104 |

FOREIGN PATENT DOCUMENTS

| | | | |
|---|---|---|---|
| 715-880 | 2/1980 | U.S.S.R. | 285/109 |

*Primary Examiner*—Lynne H. Browne
*Assistant Examiner*—Greg Binda
*Attorney, Agent, or Firm*—Barnes & Thornburg

[57] ABSTRACT

The present invention provides an internal conduit seal for conduits and pipes having an elongated elastomeric seal with first and second seal segments adjacent to the edges of the seal. The sealing segments are made up of a plurality of sealing ribs and restraining members placed externally of the ribs in each segment. The seal includes grooves positioned over each segment for expansion bands used to compress the seal against the inside of a conduit. The invention also includes an expansion band having a radiused contacting surface which in combination with a locking member of the invention positioned between an outer restraining member and an adjacent rib providing substantially improved sealing.

10 Claims, 5 Drawing Sheets

INTERNAL CONDUIT SEALING MEMBER AND BAND

FIELD OF THE INVENTION

The present invention relates to an improved internal conduit sealing member and in particular, to a sealing member made from an elastomeric material and having a pair of sealing segments located at the outer periphery of the elastomeric seal which sealing segments includes a plurality of compressible ribs and inner and outer restraining members. Each rib segment is located under an expansion band to provide seals for pipe used in carrying various fluids. The invention also relates to novel expansion band for compressing said internal sealing member and, in particular, to a radiused expansion band in combination with a locking element positioned between an outer restraining member and adjacent rib.

BACKGROUND OF THE INVENTION

It has become known to use cuffs or sealing members internally of a conduit to seal joints or damaged areas of a conduit to prevent infiltration into or leakage from the conduit or pipe. Conduits of this character typically carry water, wastewater, sewage, natural gas, petroleum and the like. Since these pipe are normally located underground, they are susceptible to damage from the environment, corrosion, cracking or leaks at the joints. In many cases it is not possible to expose or excavate the pipe for repair because of the necessary excavation would disrupt highways, building and the like. In these cases it has become acceptable to use trenchless, internal joint or damage sealing means. It is not uncommon to internally seal or repair pipes of diameters from 14 inches to 216 inches using elastomeric sealing materials. See, e.g., U.S. Pat. No. 4,685,704. The seals are placed within the pipes by skilled technicians who traverse the pipe to the damaged or leaking area.

The sealing installation process is relatively uncomplicated. The elastomeric seal generally is circular in nature, but can be dimensioned to assume other pipe shapes. The elastomeric material of the seal is typically selected for the type of material flowing through the pipe. For example, ethylene propylene diene monomers rubber is used for waste water and potable water, butadiene acrylonitrile rubber is used in natural gas applications. Normally, the seal is provided with internal annular recesses designed to accommodate metal bands which are made from stainless steel, carbon steel, or special alloys. Once the seal is positioned over the joint or leak by hand or pneumatic means, the bands are placed in to the annular grooves. A special hydraulic press is used to expand the band in the groove to compress the seal against the pipe. Special wedges or inserts are used to maintain the position of the band to maintain compression and provide a fluid tight seal.

Typically, the seals are manufactured by extrusion through a die containing the desired profile or molded, however, this is relatively expensive. The seal is extruded in the form of a belt with a cross-section in which the profile the sealing ribs located adjacent to but spaced apart from the edges, and under the band accommodating grooves. A web membrane is located between the rib sections and can be of a varying lengths to accommodate both joints and areas subject to damage or leakage. The belt is cut uneven to fit the inside circumference of the pipe, tube or tanks. Similarly, belts can be joined by adhesive, overlapping or vulcanizing to form a continuous seal that is circular or in other geometric shape.

While the use of internal sealing means such as disclosed in U.S. Pat. No. 4,685,704 afford more efficient and cost effective repair, such repairs are not inexpensive. It is therefore desirable to make the repair as well as the seal itself as trouble free and long lasting as possible. Accordingly, it is an object of the present invention to provide an internal pipe seal which can be installed using conventional hydraulic presses and bands, but provides a sealing profile which affords more effective sealing than current seal profiles. It is a further object of the invention to provide a novel seal, seal profile, and expansion band that locks in place when subjected to high velocity or low velocity flow of material transported through a pipe or struck by debris moving within a pipe or conduit. It is also an objective of the invention to provide an external seal member having a structure that controls the cold flow of elastomeric material under compression of the expansion bands.

SUMMARY OF THE INVENTION

The present invention comprises an internal conduit seal for sealing a damaged conduit or conduit joint which comprises an elongated molded or extruded elastomeric sealing member. Generally, the elastomeric member has a length which is substantially equal to the internal circumference of the conduit to be repaired and has a width adequate to accommodate the span of the joint area which is damaged. Generally, however, the elastomeric seal member is not wider than about a meter since wider seals can be formed by overlapping multiple elastomeric members. The elongated elastomeric member includes first and second spaced apart sealing segments that co-extend the length of the elastomeric member. Each sealing segment is positioned adjacent a respective edge of the elastomeric member and comprises a plurality of juxtaposed sealing ribs and an inner and outer restraining member. In the preferred embodiment three parallel spaced apart longitudinal ribs are provided between the inner and outer restraining members.

The ribs in each of the first and second sealing segments depend from the base of the elastomeric member and terminate in a tapered end portion. In the preferred embodiment, the tapered end includes at least one groove forming pair of substantially pointed sealing edges. In the preferred embodiment, this groove is preferably "V"-shaped approximately 2.5 mm in depth. However, if more than one groove is provided, that is two or more, the depth of the grooves on a rib decrease in number with multiple grooves the cross-section profile of the rib appears as a serration. The spacing between the ribs and the restraining members is such as to permit the cold flow of elastomeric material during compression. The respective restraining members depend from the base of the elastomeric material a distance which is preferably slightly less than the ribs. The end portion of the restraining members are preferably arcuate, but may have other shapes such rectangular or flat.

Positioned along the length of the elastomeric member and on the reverse side of the sealing segments and substantially overlying the respective sealing segments are first and second associated band grooves. The associated grooves are dimensioned to accommodate expansion bands in a flush compressive fit. In practice, conventional expansion bands can be used, however, the present invention provides a radiused expansion band, which, in combination with the locking element of another preferred embodiment.

In one embodiment of the invention, a continuous or segmented locking element is positioned in the space between the outer restraining members of each sealing segment and the associated first adjacent rib to such restraining member. Preferably, the locking member comprises a spring wire having knurled or edged sections along its length. The diameter of the locking element if circular or oval or its depth if rectangular or a polygon is less than the uncompressed height of the rib between which it is juxtaposed. The locking element provides grip between the elastomeric seal member when in compression and the conduit so as to resist movement when in the sealing position. In this embodiment, it is particularly advantageous to utilize the radiused or convex expansion band. With such use the force vectors through the seals segments forces the locking element into the seal member and almost a locking engagement with the conduit.

In another embodiment, arcuate edge elements are molded or extruded along the length of each edge of the elastomeric member. The arcuate edge elements are formed with an outwardly extending flange and an arcuate return adjacent to the respective outer restraining member. The arcuate extension is designed to extend outwardly from the body of the elastomeric member under compression of the latter during installation to form tapered surface from the conduit to the surface of the elastomeric member having the expansion bands. In this manner a smooth flow profile is present to provide a substantially laminar flow of fluid.

The sealing member of the present invention provides a substantially enhanced seal means for internal sealing of conduit. In addition, the invention is cost effective in providing long term protection against further leakage. Other advantages of the present invention will become apparent from perusal of the following detailed description of presently preferred embodiments of the invention taken in connection with the accompanying drawings.

PRESENTLY PREFERRED EMBODIMENTS

Figure 1:
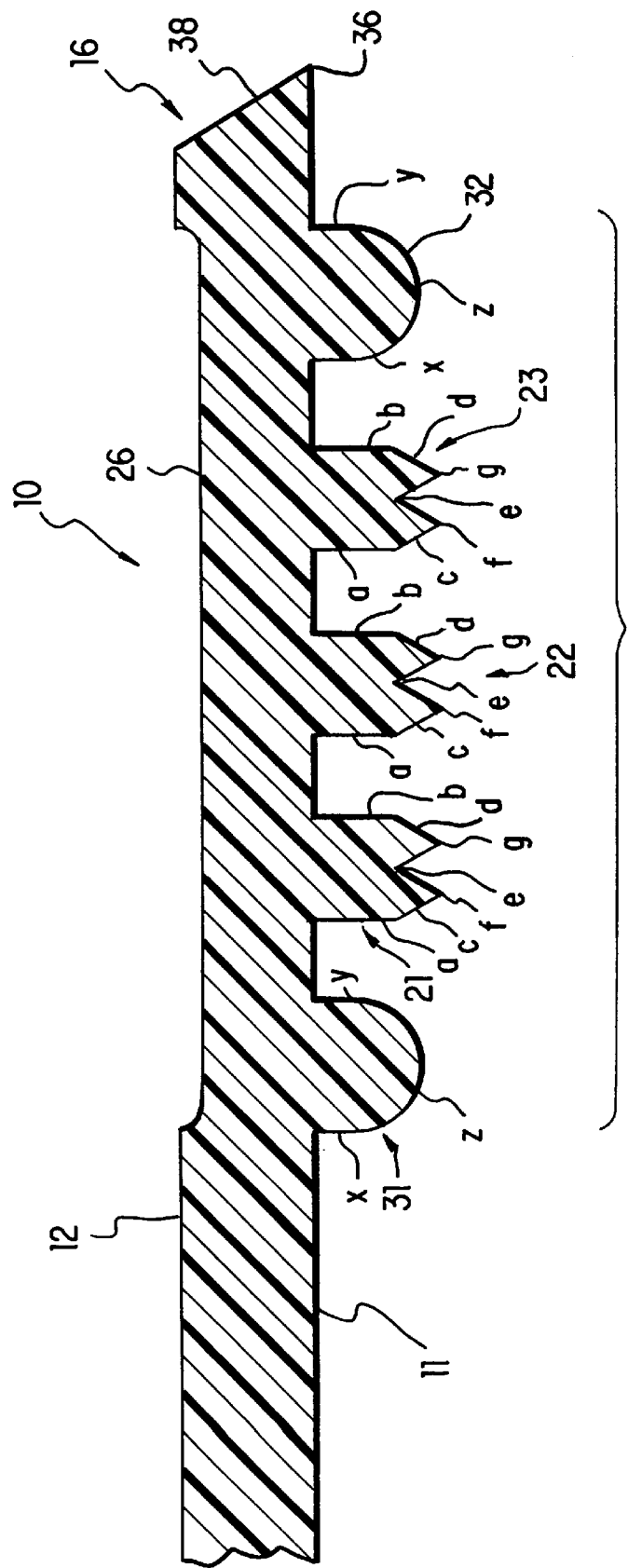
FIG. 1 is a sectional elevation of one-half of the conduit seal of the present invention.

Referring to FIG. 1, an elongated elastomeric member 10 is shown in section. Depending upon the application elastomeric member 10 can be made from a synthetic rubber such as ethylene propylene diene monomer or butadiene acrylonitrile. Elastomeric member 10 includes a first surface 11, and a second surface 12, compression surface, extending the length thereof. Depending from first surface 11 are first and second sealing segments 13 and 14. Sealing segments 13 and 14 are spaced from edges 16 and 17 (not shown), respectively, of elastomeric member 10. In the preferred embodiment of the invention, each sealing section comprises three spaced apart ribs 21, 22, and 23. As shown, ribs 21, 22, and 23 depend upon second surface 12. Each rib includes parallel sides a and b which terminate in angled end members c and d, respectively. Preferable end members c and d are positioned at an angle of approximately 60° to the horizontal, but angles from about 30° to 50° are usable.

Each rib also includes at least one groove or channel e, preferably "V"-shaped at 30 to 60° angle. Each channel or groove may also be arcuate. Each channel or groove forms at least a pair of apexes or points f and g which substantially compress during installation of seal 10 to provide enhanced grip and elastomeric cold flow to provide improved sealing and longevity under the compressive force provided by expansion bands.

Each sealing segment 13 and 14 also includes an inner and outer restraining member 31 and 32, respectively. Each restraining member has parallel side walls x and y and arcuate end z. The height of the restraining members is slightly less than that of ribs 21, 22 and 23, e.g., 1 to 1.5 mm. Outer restraining members 32 are positioned adjacent to but spaced apart from sealing edges 36 and 37, respectively, of elastomeric member 10. Elastomeric member 10 also preferably, includes tapered ends 38 and 39 which terminate at edges 36 and 37, respectively.

Generally, the width between edges 36 and 37 is preferably about 29.2 cm. Seal 10 also includes a pair of associated band grooves 26 and 27 designed to accommodate an expansion band. Band grooves 26 and 27 are formed in surface 12 over associated rib segments 13 and 14. The area 41 between segments 13 and 14 can be from about 25 cm to 61 cm. Area 41 comprises the containment area for containing any leakage from the conduit that is to be sealed.

Figure 3:
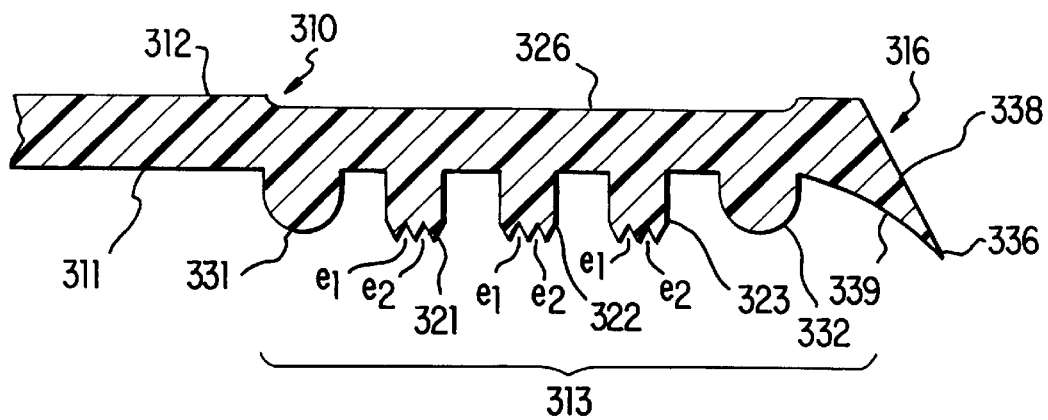
FIG. 3 is a sectional elevation of another embodiment of the present invention illustrating a tapered edge member.

Referring to FIG. 3, another embodiment of the invention is shown in which like elements bear the same reference numerals as in FIG. 1, except that they are preceded by the numeral "3". In this embodiment, elastomeric member 310 includes an inner surface 311 and a second surface 312. Band grooves 326 and 327 (not shown) are provided on surface 312 to accept an expansion band, not shown.

Sealing segment 313 includes ribs 321, 322 and 323, preferably having a pair of grooves or channels e and e2 as shown. Inner and outer restraining members 331 and 332 are provided. In this embodiment, edge 336 and 337 (not shown) are extended downward and outwardly from first surface 311 of elastomeric member 310. On the side of tapered edge 338 is arcuate extension element 339. Arcuate extension element 339 has a long radius e.g. 25 cm to 30 cm and preferably about 28 cm to provide a counter flexure upon compression of the seal by extension bands. In addition, edge 336 is extended to effectuate a smooth transition from the conduit surface to conduit surface over surface 312 of elastomeric member 310.

Figure 4:
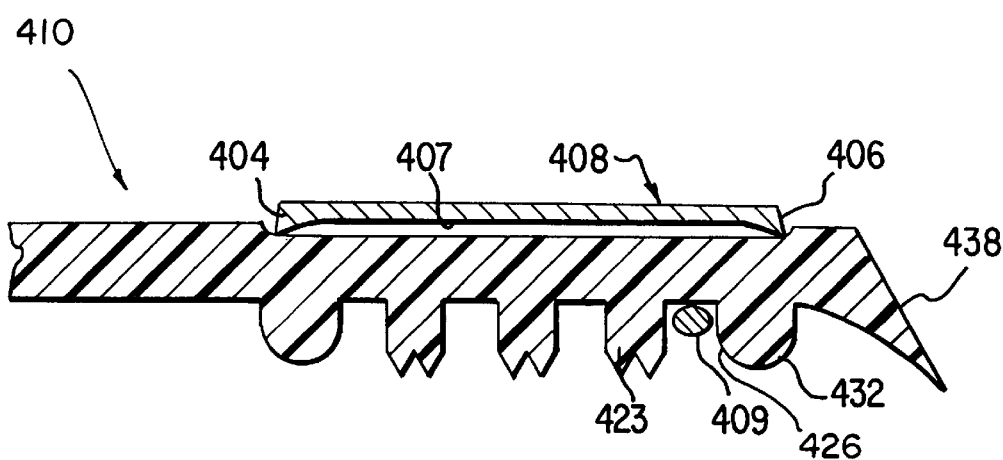
FIG. 4 is a sectional elevation of the another embodiment of the present invention illustrating the use of locking element in the embodiment disclosed in FIG. 3 a cross-section of the novel radius expansion band.
Figure 4A:
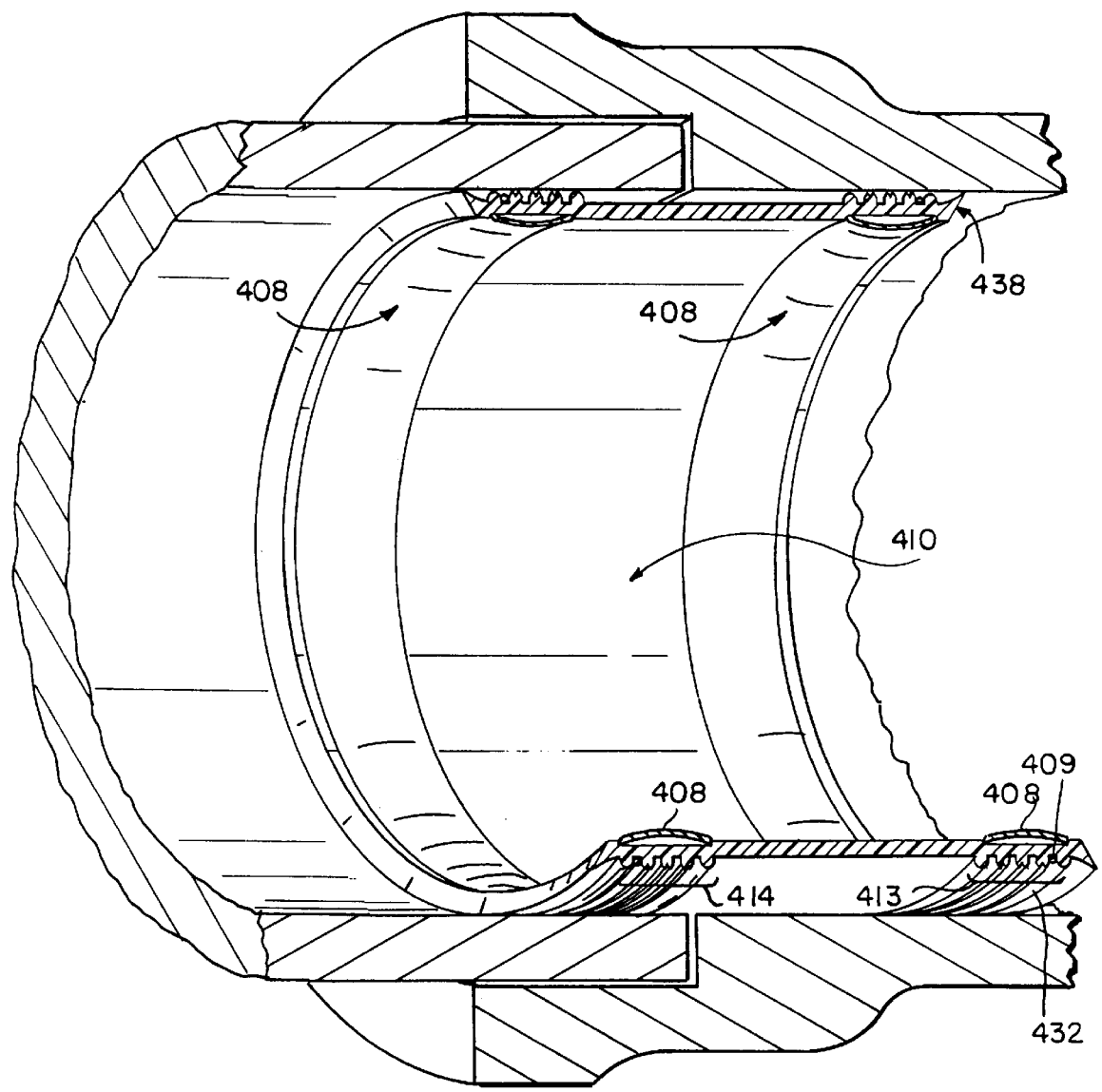
FIG. 4a is a perspective cut away of the seal of an embodiment of the present invention.
Figure 5:
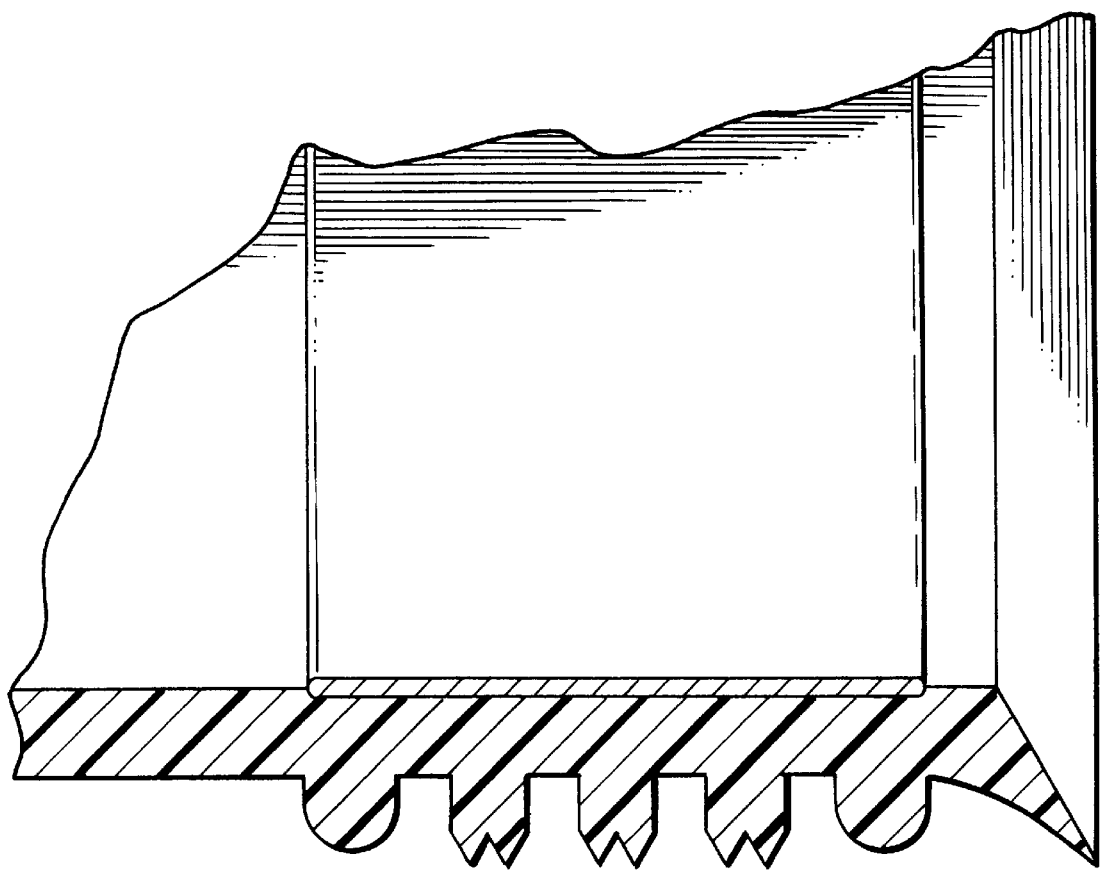
FIG. 5 is perspective view of the embodiment shown in FIG. 3 illustrating the placement of expansion band to compress the conduit sealing member against an area of a conduit experiencing leakage or infiltration.

Referring to FIG. 4 and 4a, another embodiment of the invention is shown. In this embodiment, a locking member 409 is shown. Locking member 409 is positioned between the outer rib 423 and the outer restraining member 432 of sealing segment 413 and 414. Locking member 409 is preferably round polygonal in cross-section and co-extensive with the length of the elastomeric member 410 either continuously or discontinuously which may include tapered and 438. Locking member 409 may be made from stainless steel or other material which will not flow under compression from expansion bands 408 placed in grooves 426 (427 not shown). Steel wire is the preferred material and it is further preferred that the outer surface be knurled or provided with edges to grip the surface of the conduit when elastomeric sealing member 410 is under compression. Locking member 409 is particularly effective when used in conjunction with compression band 408. Band 408 has a radiused or convex side 407 which during compression places a downward force on restraining member 432 to force it inwardly towards rib 423. Elastomeric member 410 is shown in FIG. 4 prior to compression against the inside of a conduit.

It is also desirable to select configurations such as polygonal wire, which provides a deep biting edge to both the conduit and the elastomeric member 410. Clearly, other shapes and material will work in this function provided that its cross-section, as shown in FIG. 4, is less than the height of rib 423 and outer restraining member 432 by at least 40% to 60% and preferably 50%.

Figure 2A:
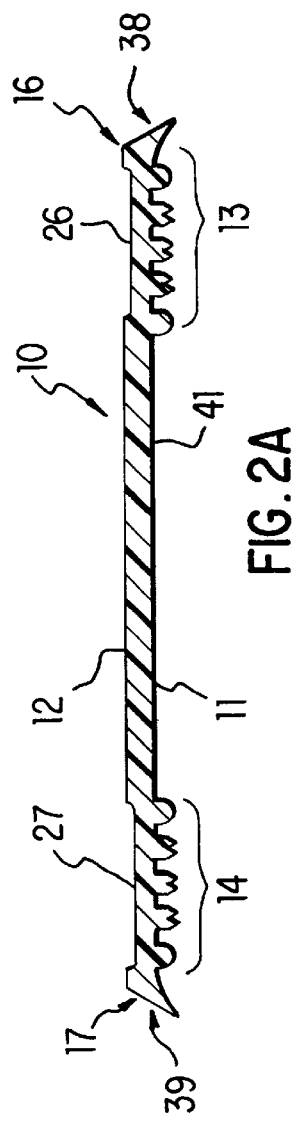
FIG. 2a and 2c are sectional elevations of the embodiment shown in FIG. 3 having various widths.
Figure 2B:
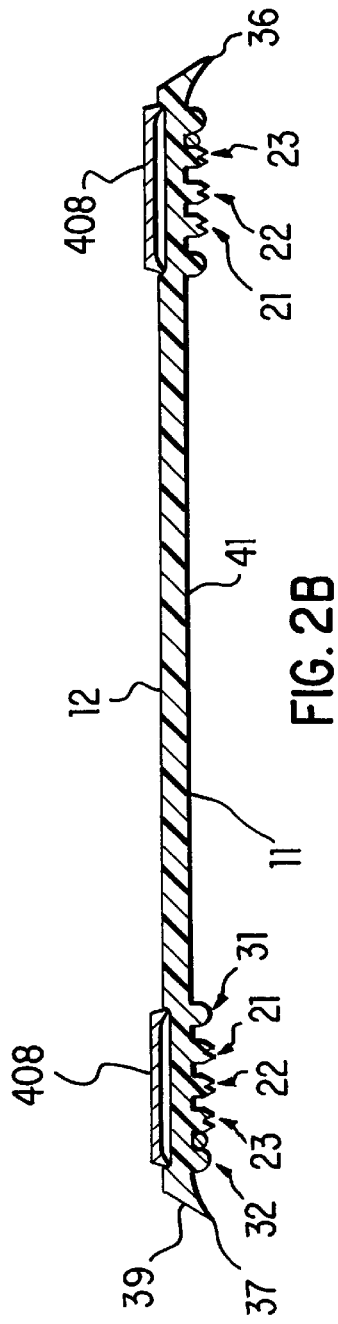
FIG. 2b is a sectional elevation of embodiment shown in FIG. 4.
Figure 2C:
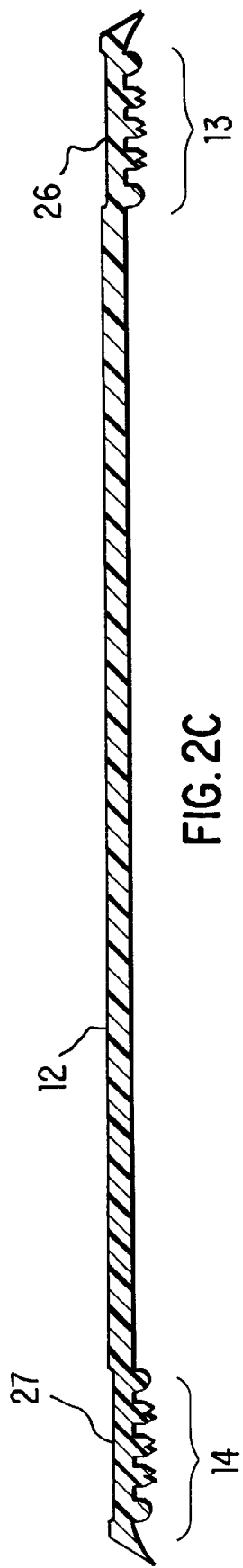

With respect to radius band 408 shown in FIG. 2b and 4, it is desirable that the radius be such that on compression of the band, its edges 406 and 404 provide an initial force which is towards the outer and inner restraining members 432 and 431, respectively, so as to cause each of them to deform inwardly towards the adjacent rib. Preferably the band 408 is made from a steel or like metal with a relatively large radius, e.g., 40 cm to 80 cm preferably about 54 cm. By compressing the restraining members there is less ability under compression during use to have the confined cold flow.

Accordingly, the present invention provides an improved seal for internal surfaces and joints of conduit. When internal seal 10 is placed inside a conduit pipe, it is self-supporting because of its profile design and a shore A hardness of the elastomer compound. The freestanding uncompressed internal seal will stay in place in contact with the pipe wall and positioned over the damaged area or leaking joint while the two compression bands are loaded into the grooves provided in the seal. The compression bands can be either those with a flat cross-section or with a radiused cross-section design in accordance with the requirements of the application. When the compression bands are expanded, their circumference increases pushing the seal tightly against the pipe wall and compressing the sealing protrusions of the invention. Greater expansion force causes the circumference of the band to increase thus increasing the compression force of the protrusions affecting an extremely tight seal on the surface of the pipe, conduit or structure. As the compression forces increase, the three ribs seal protrusions located in the center area of the five protrusions rib segments 13 and 14 begin immediately to point, load and effect a seal. As they continue to compress, sealing energy builds and the elastomer hydraulically flows filling any voids both in the surface to be sealed and the area between the ribs and restraining mean expelling all air and replacing the air with hydraulically flowing elastomer. Further, the two outer restraining mean 32 contact the conduit and build significant additional sealing force and sealing surface contact with the conduit. As compressive forces in these outermost restraining member increase, they not only increase the sealing effectiveness of this design over the prior art, but additionally increase compressive density within their structure forming a dam or bulkhead preventing cold flow and thus sealing energy loss from the centermost seal protrusions. The result is that the present invention maintains not only high sealing energy, but a longer period performance time by controlling energy loss that would occur without the incorporation of the highly compressed outermost sealing means and restraining area.

While presently preferred embodiments of the invention have been shown and described, in particularity, the invention may be otherwise embodied within the scope of the appended claims.

What is claimed is:

1. An internal conduit repair seal for sealing a conduit joint or an area of conduit subject to leakage comprising of an elongated elastomeric member, said elastomeric member comprising:

(a) first and second sealing segments positioned on a first side of said elastomeric member adjacent to, but spaced from a respective edge of said elastomeric member, each sealing segment comprising at least three spaced apart parallel ribs depending from said first side and being co-extensive with said elastomeric member, and an inner and outer restraining member positioned parallel to but spaced apart from outer ribs in each of said sealing segments said outer restraining member each forming a bulkhead under compression to prevent flow of associated parallel ribs; and (b) first and second grooves formed in a second side of said elastomeric member opposite from said first side, said grooves being co-extensive with each of said first and second sealing segments, and first and second grooves being dimensioned to accommodate an axially radiused compression band for use in compressing said seal segments against a conduit;

(c) tapered edges tapered from said second side to said first side adjacent each of said outer restraining members.

2. An internal conduit repair seal as set forth in claim 1 wherein said respective edges are tapered along their respective lengths.

3. An internal conduit repair seal as set forth in claim 2 wherein each of said tapered edge comprises an elongated tapered edge member co-extensive with said elastomeric member having an arcuate element extending between an associated outer restraining member and said tapered edge juxtaposed to said first side.

4. An internal conduit repair seal as set forth in claim 2 having a locking member positioned continuously or discontinuously and co-extensively between said outer restraining members and an adjacent rib.

5. An internal conduit repair seal as set forth in claim 4 including an expansion band positioned in each of said first and second grooves, said expansion band having a side adapted for contact with said grooving with a radius.

6. An internal conduit repair seal of claim 4 wherein said locking member comprises a multi-sided member having a cross-sectional height less than the height of said outer restraining member.

7. An internal conduit repair as set forth in claim 1, 2, 3, 4 or 5 wherein each of said ribs includes an end terminating in at least two elongated edges forming at last one rib groove.

8. An internal conduit repair seal as set forth in claim 7 wherein said rib end comprises a plurality of edges forming a plurality of rib grooves.

9. An internal conduit repair seal comprising an elongated elastomeric member having first and second sets of sealing ribs on one side and annular grooves on a second side of said member and positioned over said ribs and an expansion band adapted to fit coextensively within said annular grooves, the improvement comprising said expansion band having a radially concave side adapted for contact with the groove to apply a compressive force on said groove.

10. The improvement set forth in claim 9 including in combination therewith a locking member positioned adjacent an outer rib in each of said sets of sealing ribs to contact an internal surface of said conduit.

* * * * *